United States Patent [19]

Arp

[11] E Re. 29,936

[45] Reissued Mar. 20, 1979

[54] SWIMMING POOL WALL

[76] Inventor: George F. Arp, 27 Terrace Villa, Fairport, N.Y. 14450

[21] Appl. No.: 825,955

[22] Filed: Aug. 19, 1977

Related U.S. Patent Documents

Reissue of:

[64] Patent No.: 3,564,791
Issued: Feb. 23, 1971
Appl. No.: 802,849
Filed: Feb. 27, 1969

[51] Int. Cl.[2] ..... E02D 27/00; E04H 3/16

[52] U.S. Cl. ..... 52/169.7; 4/172.19; 52/602

[58] Field of Search ..... 52/169.7, 602; 4/172.19

[56] References Cited

U.S. PATENT DOCUMENTS

| | | | |
|---|---|---|---|
| 427,648 | 5/1890 | Webb | 52/593 |
| 1,589,938 | 6/1926 | Burney | 52/602 |
| 3,064,273 | 11/1962 | Kwake | 4/172.19 |
| 3,271,787 | 9/1966 | Clary | 4/172.19 |
| 3,410,044 | 11/1968 | Moog | 52/439 |

FOREIGN PATENT DOCUMENTS

| | | | |
|---|---|---|---|
| 129442 | 7/1919 | United Kingdom | 52/602 |

*Primary Examiner*—James L. Ridgill, Jr.
*Attorney, Agent, or Firm*—Stonebraker, Shepard & Stephens

[57] ABSTRACT

A swimming pool wall is formed of uniform sections of molded structural foam secured together, and the sections include: a front facing wall; a base integral with the bottom edge of the facing wall; a coping wall integral with the top edge of the facing wall; end walls integral with the facing wall, the base, and the coping wall; the end walls having projections and recesses fitting together for alignment of the sections; and a rib integral with the base, the coping wall, and the back of the facing wall.

7 Claims, 3 Drawing Figures

SWIMMING POOL WALL

Matter enclosed in heavy brackets [ ] appears in the original patent but forms no part of this reissue specification; matter printed in italics indicates the additions made by reissue.

THE INVENTIVE IMPROVEMENT

Previously, the walls of in-the-ground swimming pools have been constructed at the site in an expensive and laborious process. Many parts were fitted and fastened together and a separate coping was installed along the top of the pool wall.

The invention involves the discovery that pool walls can be made of uniform sections of molded structural foam if each section is shaped in a specified way. Such structural foam sections can be handled manually at the site and can be quickly set in place and secured together to form a pool wall substantially less expensive than previous pool walls. Also, such molded structural foam sections preferably include an integral coping wall along the top so that no separate coping parts are needed.

In addition to the advantages of easy assembly and installation, structural foam can be made rot-proof, mildew-proof, rust-proof, and capable of long life in the ground. This means that pool walls built according to the invention are not only less expensive but also last longer and give more satisfactory service.

SUMMARY OF THE INVENTION

The inventive swimming pool wall is formed of a plurality of uniform sections of molded structural foam secured together with each of the sections having: a vertical flat facing wall continuous for the length of the section; a base formed integrally with the bottom of the facing wall and extending perpendicularly and outwardly from the back of the facing wall; a coping wall formed integrally with the top of the facing wall and extending outwardly from the back of the facing wall; end walls formed integrally with the facing wall, the base, and the coping wall and the mutually abutting surfaces of the end walls of adjacent sections having aligned projections and recesses for alignment of adjacent sections; and ribs formed integrally with the base, the coping wall, and the back of the facing wall to extend between the coping wall and the base.

DRAWINGS

DETAILED DESCRIPTION

Figure 1:
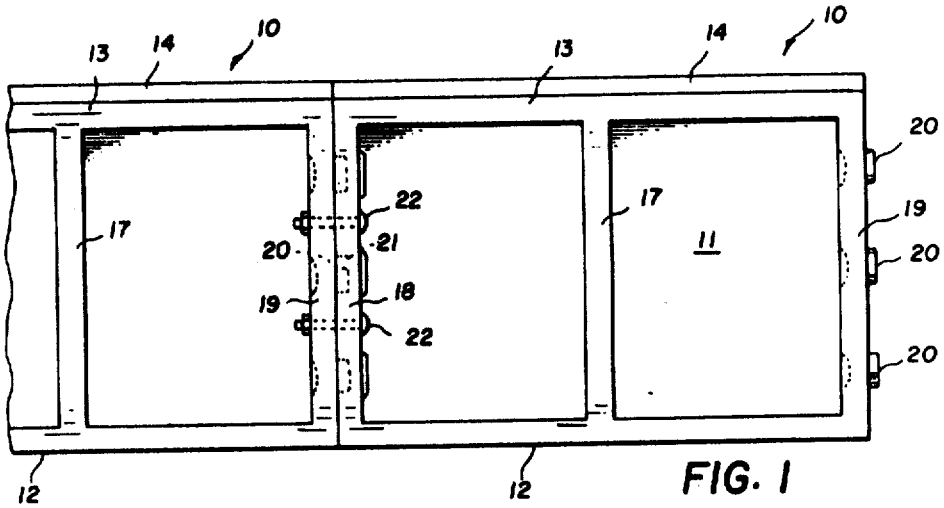
FIG. 1 is a rear elevation of a pool wall section according to the invention showing a fragment of an adjacent pool wall section connected thereto.
Figure 2:
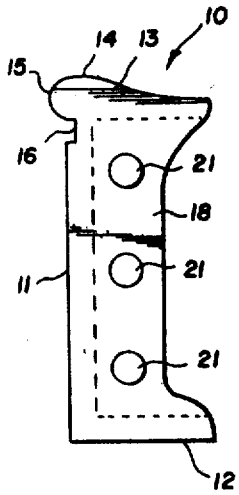
FIG. 2 is an end-elevation of the pool wall section of FIG. 1.

The inventive pool wall sections 10 illustrated in the drawings are molded of structural foam material and secured together to form the walls of in-the-ground swimming pools. Structural foam is formed of a variety of plastic materials including polyethylene, polystyrene, and others, in a process that forms molded objects of substantial size that are strong enough for structural purposes. Such structural foam material offers many advantages as a sectional swimming pool wall, and a preferred configuration of such wall sections is shown in the drawings.

Each of the sections 10 has a vertical, facing wall 11 continuous for the length of the section and disposed to form the inside of the pool wall. Wall 11 extends from top to bottom and end to end of each section 10 to support a liner containing the pool water.

A base 12 is formed integrally with facing wall 11 along the bottom edge of facing wall 11. Base 12 is perpendicular to facing wall 11 and extends outwardly relative to the pool from the back of facing wall 11. Base 12 is relatively wide, as illustrated, to afford a secure footing for section 10.

A coping wall 13 is formed integrally with facing wall 11 at the top of facing wall 11. Coping wall 13 extends outwardly relative to the pool from the back of facing wall 11, and preferably has a curved top 14, as illustrated, to provide a swimming pool coping. Curved top 14 preferably extends forward of the front face of facing wall 11 in a curved edge 15 slightly overhanging the pool water. A slot 16 is preferably molded in the top of the front face of facing wall 11 just below curved edge 15 to extend longitudinally of each section 10 to provide an anchorage for the swimming pool liner.

At least one rib 17 is formed integrally with base 12, coping wall 13, and the back of facing wall 11 to extend vertically between coping wall 13 and base 12. Sections 10 can be made in any convenient length and preferably several ribs 17 are used on each section 10, especially if relatively long sections are used. Ribs 17 can be oriented other than vertically.

End walls 18 and 19 are formed integrally with coping wall 13, facing wall 11, and base 12 at each end of sections 10. End walls 18 and 19 are disposed in mutually abutting relation, as shown in FIG. 1, between adjacent sections 10. Each end wall 19 has projections 20 extending outward in the longitudinal direction of sections 10 from the outer face of end wall 19, and each end wall 18 has recesses 21 extending inward in the longitudinal direction of sections 10 from the outer face of end wall 18. When adjacent sections 10 are placed together in abutting relation as shown in FIG. 1, projections 20 extend into recesses 21 to align sections 10 accurately. Many other arrangements of projections and recesses for alignment of sections 10 are possible within the spirit of the invention. Aligned and abutted sections fitted together with mutual projections and recesses are secured together by any convenient means such as bolts 22.

Figure 3:
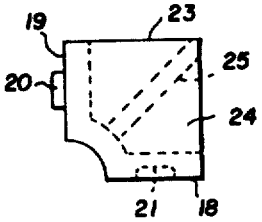
FIG. 3 is a plan view of a corner piece for connecting the inventive pool wall sections.

A corner piece 23 is shown in FIG. 3 for connecting pairs of sections 10 at right angles to each other at the corners of the pool wall. End wall 18 of section 23 has recesses 21 for receiving projections 20 of an end wall 19 of an adjacent section 10, and end wall 19 of corner piece 23 has projections 20 to fit into recesses 21 in an end wall 18 of an adjacent section 10. The top 24 of corner piece 23 is given a coping shape matching the top 14 of sections 10. A vertical rib 25 is formed integrally with corner piece 23 to extend from the bottom to the top of corner piece 23 to strengthen corner piece 23.

In use, sections 10 are light enough to be handled manually, and are merely set in place in the excavation, aligned, fitted together with interlocking projections and recesses, and secured together to form a continuous pool wall. No separate coping or other parts are required, and after the wall is made, it is merely necessary to backfill the excavation, fit the lining in place, and secure it in slot 16. Structural foam sections 10 provide an accurate fit, standard and unerring sizes, lightweight, resilience and easy assembly. They are also rust-proof, rot-proof, mildew-proof, and enjoy a long life after installation.

Persons wishing to practice the invention should remember that other embodiments and variations can be adapted to particular circumstances. Even though one point of view is necessarily chosen in describing and claiming the invention, this should not inhibit broader or related applications within the spirit of the invention. For example, different strengthening ribs and different projections and recesses for aligning adjacent sections can be used within the spirit of the invention.

I claim:

1. A swimming pool wall comprising:

(a) a plurality of uniform sections;

(b) means for securing said sections together;

(c) said sections being formed of molded structural foam and comprising:

(1) a vertical, flat, facing wall continuous for the length of said section;

(2) a base formed integrally with said facing wall;

(3) said base extending along the bottom of said facing wall;

(4) said base being perpendicular to said facing wall;

*(5) said base extending outwardly from the back of said facing wall;*

[(5)] *(6)* a coping wall formed integrally with said facing wall;

[(6)] *(7)* said coping wall extending along the top of said facing wall;

[(7)] *(8)* said coping wall extending outwardly from the back of said facing wall;

*(9) said coping wall having a curved portion extending forward of the front face of said facing wall;*

[(8)] *(10)* end walls formed integrally with said facing wall, said base, and said coping wall;

[(9)] *(11)* said end walls extending vertically between said base and said coping wall at each end of said section;

[(10)] *(12)* said end walls extending outwardly from the back of said facing wall;

[(11)] *(13)* said end walls of adjacent ones of said sections having mutually abutting surfaces;

[(12)] *(14)* said mutually abutting surfaces having aligned projections and recesses arranged for fitting together to align said adjacent sections;

[(13)] *(15)* a rib between said end walls;

[(14)] *(16)* said rib being formed integrally with the top of said base, the bottom of said coping wall, and the back of said facing wall; and

[(15)] [said coping wall having a curved portion extending forward of the front face of said facing wall.]

*(17) said rib extending outwardly from the back of said facing wall.*

2. The swimming pool wall of claim 1 wherein said [sections] *projections* and said recesses are on an opposite end of said sections.

3. The swimming pool wall of claim 1 wherein the front face of said facing wall is formed with a shallow, longitudinal slot in the region of said coping wall.

4. The swimming pool wall of claim 1 including molded structural foam corner pieces arranged to connect pairs of said sections oriented perpendicular to each other.

5. The swimming pool wall of claim 4 wherein said corner pieces include end walls having said projections and said recesses.

6. The swimming pool wall of claim 4 wherein said front face of said facing wall is formed with a shallow slot on the region of said coping wall.

7. The swimming pool wall of claim 6 wherein said projections are on one end of said sections and said recesses are on an opposite end of said sections.

* * * * *